UNITED STATES PATENT OFFICE 2,427,255

ARTIFICIAL WAXES COMPRISING REACTION PRODUCTS OF MALEIC ANHYDRIDE AND PARTIAL ESTERS OF STEARIC ACID AND POLYHYDRIC ALCOHOLS OF THE PENTAERYTHRITOL SERIES, METHODS FOR PREPARING, AND COMPOSITIONS CONTAINING THE SAME

Harry Burrell, Paramus, N. J., Philip I. Bowman, Syracuse, N. Y., and Robert H. Barth, Ridgewood, N. J., assignors, by mesne assignments, to Hayden Chemical Corporation, New York, N. Y., a corporation of Delaware No Drawing. Application July 28, 1942,
Serial No. 452,664

10 Claims. (Cl. 106—287)

This invention relates to artificial waxes consisting essentially of reaction products of stearic acid, maleic anhydride and a polyhydric alcohol of the pentaerythritol series (pentaerythritol and polypentaerythritols), to processes of preparing such artificial waxes and aqueous dispersions and other compositions containing said artificial waxes.

Many attempts to prepare substitutes for such natural waxes as carnauba wax and beeswax have been recorded in the literature. None of these materials has displaced the natural product, the demand for which has been increasing steadily for many years. The inadequate supply, together with inability to produce a substitute having satisfactory physical properties, has kept the price of the natural products at a high level.

One of the most important physical properties which makes carnauba wax so desirable is its hardness. Many attempts have been made to duplicate this property in synthetic waxes, but so far as we are advised, the natural wax has never been duplicated, much less surpassed. The melting point of waxes cannot be used as an indication of hardness at room temperature, although a melting-point test is commonly made for this purpose. The uses and desirability for a carnauba wax substitute are too well known to require detailed discussion. The waxes produced in accordance with the present invention have properties which allow substitution for carnauba wax, and in many cases the properties surpass those of carnauba wax.

A principal advantage of the waxes disclosed therein is that their properties can be so varied that they may be formulated to replace many waxes other than carnauba, such as beeswax, ozokerite, Japan wax, insect wax, Chinese wax, paraffin, montan wax, etc. However, the waxes should not be considered as merely substitutes for naturally occurring materials since in some properties they frequently surpass natural waxes. For instance, waxes may be prepared which are actually harder than carnauba wax.

The products of this invention are obtained by esterifying pentaerythritol or a polypentaerythritol with monobasic saturated fatty acids containing from 10 to 22 or more carbon atoms per molecule. These esters may be modified with other acids, including certain dibasic acids and monobasic acids of the fatty acid series with fewer than 10 carbon atoms per molecule, provided these latter acids are used in minor amounts.

Although the present specification is directed generally to the preparation of waxy products that are esters of fatty acids and polyhydric alcohols of the pentaerythritol series, the claims are restricted to such waxes as are reaction products of maleic anhydride, stearic acid and such polyhydric alcohols in the proportion of approximately 0.75 equivalent of stearic acid (0.75 mol) and approximately 0.25 equivalent of maleic anhydride (0.125 mol) for each equivalent of the polyhydric alcohol. Such waxes are disclosed specifically in Examples 1 and 6 hereinafter, which waxes have a higher Sward hardness than carnauba wax.

In the manufacture of pentaerythritol by the condensation of acetaldehyde and formaldehyde, in addition to pentaerythritol itself, smaller amounts of other hydroxylated substances are also obtained. One of these, which is obtained in considerable amount is dipentaerythritol, which is an ether having the following structure:

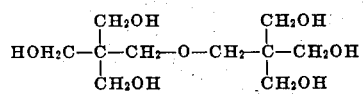

(See Brün, "Ueber den Dipentaerythrit," Wilhelm Greven, Krefeld, 1930.)

Another hydroxylated substance, obtained in somewhat smaller amounts, is white and crystalline, melts at 230–240° C., and has a hydroxyl content of 33%. The chemical structure of this substance is not known, and there is a possibility that it may be a mixture of chemical entities. It seems fairly certain, however, that it is related to dipentaerythritol in that it contains pentaerythritol residues bound by ether linkages. Regardless of chemical structure, for purposes of definition in this specification and in the claims, this substance will be termed "pleopentaerythritol." The term is not intended to indicate that the substance necessarily is formed either actually or theoretically by combination of pentaerythritol residues, but merely signifies that it is probably a product similar to pentaerythritol and dipentaerythritol.

Dipentaerythritol and pleopentaerythritol may be grouped together under the generic term "polypentaerythritols."

By "polypentaerythritols" are meant those compounds having higher molecular weights than pentaerythritol which are formed either actually or theoretically by etherifying one or more of the hydroxyl groups of pentaerythritol with other pentaerythritol residues. These polypentaerythritols have a greater number of hydroxyl groups than pentaerythritol, that is to say five or more (as for instance when an ether is formed between two or more molecules of pentaerythritol).

Mixtures of pentaerythritol and polypentaerythritols or of these substances with other alcohols, may be used to esterify the fatty acid constituents of the waxes. The polypentaerythritols, in general, usually produce a slightly harder, slightly higher melting wax than does pentaerythritol. Saturated fatty acids are the preferred acid ingredients of the ester-waxes, and these may include capric, myristic, lauric, stearic, palmitic, arachidic, behenic, and similar straight or branched chain saturated fatty acids. Mixtures of these fatty acids may also be used, and such mixtures may include minor proportions of unsaturated acids such as oleic or linoleic acids. In this specification and in the claims, when a specific fatty acid is named, it is intended that such names shall include within their scope those commercially available mixtures in which the named fatty acid predominates. Certain special mixtures such as "Neo-Fat 1-54," which consists of 67% palmitic, 29% stearic, and 4% oleic acids, which is a commercially available eutectic mixture of these fatty acids, is especially desirable for certain purposes. The oleic acid may be entirely omitted, if desired, the eutectic mixture then being 70% palmitic acid and 30% stearic acid.

In addition to these fatty acids, it has been found that the esters may be modified by esterifying a portion of the available hydroxyl groups in the pentaerythritol-type alcohol by other acids such as maleic and fumaric and their operable equivalents. For certain practical reasons, it may be desirable to use the anhydrides of certain of these acids for the actual preparation of the esters.

A suitable proportion of fatty acid is that required by stoichiometric considerations, but a greater or less amount may be used if desired in certain instances. For instance, more than the stoichimetric amount of fatty acid may be used if it be desired to make a wax which will emulsify upon adding to an aqueous alkaline solution. Somewhat less than the stoichiometric amount may be used if an acid-free wax is required. If still less, say 0.5 to 0.25 of the stoichiometric amount, is used, the waxes so formed are somewhat surface active, as disclosed in the application of Robert H. Barth and Harry Burrell, Serial No. 447,782, filed June 20, 1942, and water may be emulsified therein without external or additional emulsifying agents. The stoichiometric amounts are easily determined by the usual analyses for carboxyl and hydroxyl groups, for example, by determining the acid number and acetyl value.

For certain types of unmodified waxes, equal equivalents of, say, stearic or palmitic acids may be reacted with pentaerythritol, dipentaerythritol, or a mixture of these, such as occurs in the technical pentaerythritol "Pentek." Such products will be hard waxy substances, such as are described in the examples of this specification.

A wax prepared from equal stoichiometric equivalents of technical pentaerythritol (a grade known as "Pentek"), and of stearic acid (a grade known as "Neo-Fat 1-65"), possesses a greater hardness, as measured by the Sward hardness rocker, than does carnauba wax. This hardness can be greatly increased, as disclosed in Examples 1 and 6 hereinafter, by substituting part of the fatty acid by a polybasic acid such as maleic and fumaric acids, or their anhydrides or operable equivalents. Up to half of the stoichiometric equivalents of fatty acid may be replaced by maleic anhydride and the products will remain waxy.

In the case of a wax prepared from stearic acid, if from 50% to 70% of the equivalents of stearic acid are replaced by phthalic anhydride, the products are no longer waxy in nature, but are soft balsam-like materials; if more than 50% of the equivalents are replaced by maleic anhydride, or more than 70% by phthalic, the reaction mixtures form gels before the reaction is complete. Such non-waxy products as these do not come within the scope of this invention.

It has also been found that by modifying these waxes with abietic acid or rosin, the softening point as well as the hardness decreases, and the plasticity increases, so that products resembling beeswax in physical appearance and also, surprisingly enough, in odor, can be made. Such products are described in Examples 2, 3 and 4 hereinafter, and in general it may be said that if rosin is used as part of the monobasic acid constituents, it is desirable that not more than 25 equivalent-% of fatty acid be replaced by polybasic acid.

In reacting the ingredients to form the waxes of this invention, care must be exercised to prevent the maleic anhydride from reacting preferentially with the pentaerythritol or polypentaerythritol, since the rate of reaction of maleic anhydride is apparently much faster than the reaction of pentaerythritol or polypentaerythritol with a fatty acid. The result of such preferential reaction, which usually occurs if all of the ingredients are mixed together and heated, is to form a non-homogeneous product consisting of gelled particles mixed with a waxy product. This may be prevented if the fatty acid is first reacted with the pentaerythritol or polypentaerythritol in the absence of polybasic acid. After the fatty acid has partially or completely reacted the polybasic acid may be added and allowed to react. Using this stepwise procedure, hard, homogeneous, waxy products are obtained.

Temperatures of from 180° C. to 250° C. are desirable in reacting the ingredients, but temperatures of 150° C. to 350° C. can be used. In many cases it is advantageous to carry out the reactions in the presence of a catalyst which will promote the reactions of pentaerythritol; such substances are described and claimed in the copending applications of Harry Burrell, Serial Numbers 382,586 and 433,942, which have issued as Patents Nos. 2,360,393 and 2,360,394, respectively, and include the naphthenates or stearates of lithium, calcium, strontium, barium, zinc, and cadmium. The preparation of the waxes may be carried out in an inert atmosphere, such as under a blanket of carbon dioxide or nitrogen, if desired, and such procedure aids in preventing the development of objectionably dark colors. Agitation of reactants is desirable, especially in the heating-up period. An inert azeotropic solvent, such as a petroleum distillate, may be used to aid in the removal of water of esterification, or the reaction may be carried out at subatmospheric pressures.

In general, the solubilities in water and in organic solvents of the waxes is not great, and therefore polishes, coatings, and objects made from the waxes are quite resistant to such agents. The best solvents are hydrocarbons, both aliphatic and aromatic, and various petroleum distillates can be used to advantage.

The synthetic waxes of this invention are compatible with all of the common naturally occurring waxes, including montan wax, paraffin, ceresin, beeswax, carnauba, Japan wax, etc. Blends can therefore be made if desired, either for extending purposes or for improvement in properties of the natural waxes. Blends can also be made with such diverse materials as calcium naphthenate, calcium stearate, magnesium stearate, aluminum palmitate, zinc stearate, zinc resinate, rosin, bentonite, and the like.

The waxes can be emulsified by the usual methods employed in the art, such as adding an emulsifying agent, for example an amine soap, to the melted wax, and then adding water with agitation. Paste waxes can easily be made from waxes which are prepared with an excess of pentaerythritol or polypentaerythritol, that is, waxes having some free hydroxyl groups; or from blends of waxes prepared from stoichiometric proportions with pentaerythritol mono-stearate or di-stearate. These latter pentaerythritol compounds are described in copending application of Robert H. Barth and Harry Burrell Serial No. 378,052, which has issued as Patent No. 2,356,745, and its divisions. Such waxes or wax blends can be melted and water added to them with agitation, so that emulsions are obtained which are pastes when cooled to room temperature. These paste waxes are easily applied to surfaces, such as floors, wood, and linoleum, and may be rubbed up to a brilliant, glossy finish, the gloss of which will exceed that of carnauba wax in many instances. Solvents, such as petroleum distillates or coal-tar hydrocarbons, may be added to the waxes to improve the consistency and application of the pastes or emulsions.

The following examples are for purposes of illustration only, and should not be so construed as to limit the invention as to proportions or or scope. Parts are by weight.

Example 1.—One thousand (1000) parts of stearic (approximately 3.5 mols) acid, 168 parts of technical pentaerythritol ("Pentek," containing 85% monopentaerythritol and 15% dipentaerythritol, which is approximately 4.7 equivalents) and 10 parts of calcium naphthenate were heated with constant agitation under an atmosphere of carbon dioxide to a temperature of 250° C., and held at this temperature 1.25 hours. The reaction mixture was cooled to 150° C., and 58 parts maleic anhydride (approximately 0.59 mol) were added. The temperature was again raised to 250° C. and held at 245–250° C. for 4 hours with constant agitation under a carbon dioxide atmosphere.

The product at room temperature was a hard, light brown, waxy solid. The melting point, as determined by the Stroock and Wittenberg mercury method, was 65.2° C. The hardness, as determined by the Sward hardness rocker on a thin film melted on a steel plate, was 44. A film of natural yellow carnauba wax was tested by the same method for comparison purposes, and was found to have a Sward hardness of 18 and the Sward hardness of "Pentek" tetrastearate was 22 (see Example 5). The synthetic wax was insoluble in water, ethanol, and acetone; soluble hot but only slightly soluble cold in butanol, diacetone, dichlorodiethyl ether, butyl acetate, ethyl lactate, "Cellosolve," and dioxane; and soluble in toluene, "Varsol #1," "Solvesso #1," and ethylene dichloride. It was also miscible with montan wax, ceresin wax, paraffin wax, carnauba wax, and beeswax.

Example 2.—Fifty (50) parts of the wax produced as described in Example 1 were melted together with 25 parts of rosin. The cooled product was a semi-plastic wax having an appearance, color, and odor very similar to beeswax. The Stroock and Wittenberg mercury method melting point was 58.4° C.

Example 3.—A mixture of 106 parts rosin (approximately 0.30 equivalent, M. W. 345) and 12.2 parts of maleic anhydride (approximately 0.124 mol) was heated to 150° C. and held at that temperature for about 30 minutes. This rosin-maleic adduct was set aside for use as described below.

In another vessel, 46.7 parts of technical pentaerythritol having a hydroxyl value of 47.6% (approximately 1.34 equivalents), 212 parts of stearic acid (approximately 0.745 mol) having an acid number of 198, and 2 parts of calcium naphthenate were mixed and heated under an atmosphere of carbon dioxide with constant stirring to a temperature of 230° C. in 1 hour. The reaction mixture was then cooled to under 150° C., and the previously prepared rosin-maleic adduct was added. The entire mixture was then reheated to 230° C. and held at this temperature for 2.5 hours.

The cooled product was very similar to that of Example 2, except that the odor was somewhat less pronounced, although still greatly resembling besswax. The acid number of this was was, of course, much lower than that of Example 2, since substantially all of the rosin had been esterified. The Stroock and Wittenberg melting point was 54.8° C. The wax was soluble in toluene, "Varsol #1," "Solvesso #1" and ethylene dichloride; and soluble hot but only slightly soluble cold in acetone, ethanol, butanol, diacetone, dichlorodiethyl ether, butyl acetate, ethyl lactate, "Cellosolve," and dioxane. The Sward hardness was 10, as compared with 5 for paraffin wax and 3 for beeswax. The resistance to abrasion as determined with the "Taber Abraser" was 16 cycles (using CS 10 wheels) per micron of film thickness, as compared with 4.0 for paraffin wax and 4.6 for beeswax. The wax was suitable for a "non-slip" floor wax.

Example 4.—A wax apparently identical with that of Example 3 was made using the same ingredients, but forming the rosin-maleic adduct in situ. Thus, 46.7 parts of technical pentaerythritol, 212 parts of stearic acid, and 2 parts of calcium naphthenate were heated up to 230° C. in 43 minutes and held at 230° C. for 30 minutes. The partial ester was cooled and 12.2 parts of maleic anhydride were added. The reaction mixture was reheated to 230° C. and held at that temperature for 2 hours and 10 minutes. The resultant product was again cooled and 106 parts of rosin were added. This final mixture was again reheated at 230° C. for 7 hours.

The cooled wax was very similar in appearance and properties to that of Example 3, and was evidently chemically identical therewith.

Example 5.—A technical pentaerythritol tetrastearate was prepared by reacting one equivalent of "Pentek" (equivalent weight=35.7 as determined by hydroxyl value) with one equivalent of "Neo-Fat 1-65" (equivalent weight=283 as determined by acid number) at 220° C.–250° C. until the acid number of the ester dropped below 10.

This product was a very light-colored, hard wax which had a Stroock and Wittenberg melting point of 70° C. and a Sward hardness of 22 (for comparison carnauba wax=18). The abrasion resistance as measured with the Taber Abraser was 43 cycles of the CS 10 wheels per 0.001 mm. thickness. The same determination on carnauba wax gave 42 cycles. The wax of this example is suitable for non-drip candle coatings, polishes, and coating and adhesive compositions.

*Example 6.*—A wax having the same stoichiometric proportions as in Example 1 was prepared, using technical dipentaerythritol having an equivalent weight of 42.5. Thus, 42.5 parts of the dipentaerythritol (approximately 1 equivalent) and 212 parts of commercial stearic acid (approximately 0.745 mol) were heated together up to 241° C. over a period of 40 minutes. The product was cooled to 124° C. and 12.2 parts of maleic anhydride (approximately 0.124 mol) were added. The resulting reaction mixture was heated at 245–260° C. for 5 hours.

The final product was a good, hard, light brown, waxy solid having a Stroock and Wittenberg melting point of approximately 67.2° C. and a Sward hardness of approximately 58. This wax had identical solubilities and wax-miscibilities with that of Example 1.

*Example 7.*—One equivalent of "Pentek" grade technical pentaerythritol (equal to 35.7 parts), and 0.75 equivalent of stearic acid (equal to 212 parts) were reacted together by heating up to 219° C. At this time the reaction mixture was clear and homogeneous. The partial ester was cooled to room temperature and reheated with 0.25 equivalent (equal to 18.5 parts) of phthalic anhydride and held at 240–250° C. for 2 hours and 10 minutes.

The product was a light brown, hard wax having a Stroock and Wittenberg melting point approximately of 64.8° C. and a Sward hardness of approximately 32. It was soluble and wax-miscible; as in Example 1.

*Example 8.*—One equivalent of technical pentaerythritol (35.7 parts) and 0.6 equivalent of stearic acid (173 parts) were heated to 231° C. with constant stirring in an atmosphere of carbon dioxide, and cooled to 130° C. when 0.4 equivalent of maleic anhydride (19.6 parts) were added.

The whole was heated at 250° C. for 5.5 hours. The resulting product was a medium hard, medium brown-colored wax having a Stroock and Wittenberg melting point of 57.5° C. The solubility was the same as that of Example 1, except that the wax of this example was insoluble in ethyl lactate and Cellosolve.

*Example 9.*—One hundred forty-two (142) parts of "Neo-Fat 1-65" (approximately 0.5 mol), 1.5 parts of calcium naphthenate and 35.7 parts of "Pentek" (approximately 1 equivalent) were heated to 230° C., cooled, and 24.5 parts of maleic anhydride (approximately 0.25 mol or 0.5 equivalent) were added. The resulting mixture was heated at 230° C. for 5.25 hours.

The wax so formed had a Stroock and Wittenberg melting point of 50.9° C.

*Example 10.*—A mixture of 200 parts of stearic acid (approximately 0.70 mol), 2 parts of calcium naphthenate, and 35.7 parts of technical pentaerythritol (containing about 15% dipentaerythritol, which is approximately 1 equivalent) was heated with constant stirring in an atmosphere of carbon dioxide up to 250° C. in 45 minutes, and held at 250° C. for 1 hour. The reaction mixture was cooled to 150° C., and to it was added a linseed oil-maleic adduct previously prepared by heating to 150° C. 12 g. of linseed oil fatty acids and 12.2 g. maleic anhydride (approximately 0.124 mol). This mixture was again heated to 250° C. and held at that temperature for 4.75 hours.

The product was a medium brown-colored wax.

*Example 11.*—In an apparatus fitted with thermometer, agitator, and distilling trap, a mixture of 100 parts of lauric acid, 17.8 parts of technical pentaerythritol and 40 parts of a petroleum distillate known as "Amsco No. 140 Solvent" was gradually heated up to 320° C. over a period of 1 hour and 10 minutes. During this time the petroleum distillate was partially refluxed and returned to the reaction vessel after the water of esterification had been separated therefrom in the trap. The petroleum distillate was finally also drawn off.

The resulting wax was a white semi-crystalline solid or rather low melting point, and had an acid number of 20.

*Example 12.*—The procedure of Example 11 was repeated using 228 parts of myristic acid, 35.7 parts of technical pentaerythritol, and 40 parts of "Amsco No. 140 Solvent," and heating to 320° C. over a period of 3 hours.

The product was similar to that of Example 11.

*Example 13.*—The procedure of Example 12 was repeated, except that 256 parts of palmitic acid were used instead of myristic acid. The final wax was similar in appearance to that of Example 12, except that it was somewhat harder and less crystalline.

*Example 14.*—A mixture of fatty acids known as "Neo-Fat 1-54," which is stated to consist of 67% palmitic, 29% stearic and 4% oleic acids, and which mixture is a eutectic, was used to prepare an excellent light-colored, non-crystalline, hard, glossy wax. Thus, 250 parts of "Neo-Fat 1-54" (approximately 0.975 mol), 45 parts of technical pentaerythritol (85% pentaerythritol and 15% dipentaerythritol which is approximately 1.30 equivalents) and 2.5 parts of calcium stearate were melted together under an atmosphere of carbon dioxide and heated up to 255° C. The partially reacted materials were cooled to 150° C., and 15.5 parts of maleic anhydride (approximately 0.158 mol) were added. The whole was then heated at 250° C. for 2.5 hours, and then the temperature was raised to 300° C. in 15 minutes, when heating was stopped.

This wax when solidified had a highly polished surface, such as suitable for carbon paper or phonograph record compositions.

*Emulsions.*—Many waxes prepared according to this invention, including the waxes described in the foregoing examples, have been emulsified by various methods familiar to the art. The method here described may be taken as typical, and the emulsions so obtained may be considered as representative. The procedure was as follows: Fifty (50) parts of wax and 10 parts of soy oil fatty acids were melted together in an apparatus heated by a water bath at constant temperatures between 70 and 95° C. To this mixture 10 parts of morpholine were added with stirring. When the resulting mixture was homogeneous, 230 parts of warmed water were slowly added with constant stirring. It was usually found that the mass would become thick and pasty at first as the water was added, and then would thin out as the last portions of water were incorporated.

The following table illustrates the properties of some of these emulsions:

| Wax used as described in foregoing Example Number— | Stability of Emulsion | Gloss of dried, unburnished film applied to clean linoleum surface, expressed as per cent of light incident at 75° from normal reflected at 75° from normal |
|---|---|---|
| | | Per cent |
| 14 | Stable creamy liquid | 4.6 |
| 11 | ----do---- | 3.0 |
| 50% #1 [1] | ----do---- | 3.4 |
| #1 with palmitic [2] | ----do---- | 2.8 |
| 3 | ----do---- | Dull |
| 4 | ----do---- | Dull |
| 6 with TEA [3] | Stable cream | |
| Pentaerythritol distearate | ----do---- | |

[1] Carnauba wax blended with an equal weight of wax from Example 1.
[2] Variation of emulsion procedure in using palmitic acid instead of soy acids.
[3] Variation of emulsion procedure in using triethanolamine instead of morpholine.

*Paste wax 1*

| | Parts |
|---|---|
| Wax of Example 1 or Example 14 | 13.6 |
| Ceresin wax | 13.6 |
| "Varsol No. 1" petroleum distillate | 40 |

The foregoing ingredients were warmed to about 90° C., when they blended very easily. The cooled product was a paste wax of light color and good consistency. When applied to linoleum in a thin film and allowed to dry 5 or 10 minutes it could be rubbed up to an excellent polish.

*Paste wax 2*

| | Parts |
|---|---|
| Wax of Example 1 | 40 |
| Paraffin wax | 40 |
| Pentaerythritol distearate | 20 |
| "Varsol No. 1" petroleum distillate | 80 |

The foregoing ingredients were melted together and 160 parts of hot water were mixed in with stirring. A homogeneous mixture was readily obtained. Stirring was continued until the wax was cool. The product was a nearly white, firm, paste wax which could be applied to linoleum or wood and rubbed up to a beautiful gloss.

The foregoing illustrate the preparation of very useful waxes and wax compositions. The application of the products to specific articles of commerce can be accomplished by anyone skilled in the art. For instance, the following products can readily be made comprising one or more of the waxes of the invention:

1. Non-drip candle coatings,
2. Floor wax, self-polishing,
3. Shoe and leather polishes,
4. Furniture and automobile polishes (and other rubbing polishes) both paste and cream types,
5. Mold lubricant for stamping operations or plastic molding,
6. Paraffin modifiers,
7. Sealing waxes, sealers, and adhesives,
8. Coating compositions and film-former modifiers,
9. Carbon paper,
10. Duplicating machine stencils,
11. Printing inks, both as vehicles and as offset-preventing waxes,
12. Water-proofing compositions,
13. Food-preserving coatings,
14. Phonograph records,
15. Plastic compositions,
16. Paper coatings and paper sizes,
17. Electrotypes.

Having thus described our invention, what we claim as new and desire to secure by Letters Patent is:

1. An artificial wax consisting essentially of the reaction product of stearic acid, maleic anhydride and a polyhydric alcohol selected from the group consisting of pentaerythritol, polypentaerythritols and mixtures thereof, in which the polyhydric alcohol is substantially completely esterified by the acids in the proportion of approximately 0.75 equivalent of stearic acid and approximately 0.25 equivalent of maleic anhydride for each equivalent of the polyhydric alcohol.

2. An artificial wax consisting essentially of the reaction product of stearic acid, maleic anhydride and pentaerythritol, in which the pentaerythritol is substantially completely esterified by the acids in the proportion of approximately 0.75 equivalent of stearic acid and approximately 0.25 equivalent of maleic anhydride for each equivalent of pentaerythritol.

3. An artificial wax consisting essentially of the reaction product of stearic acid, maleic anhydride and dipentaerythritol, in which the dipentaerythritol is substantially completely esterified by the acids in the proportion of approximately 0.75 equivalent of stearic acid and approximately 0.25 equivalent of maleic anhydride for each equivalent of dipentaerythritol.

4. An artificial wax consisting essentially of the reaction product of stearic acid, maleic anhydride and a mixture of pentaerythritol and dipentaerythritol, in which the pentaerythritol and dipentaerythritol are substantially esterified by the acids in the proportion of approximately 0.75 equivalent of stearic acid and approximately 0.25 equivalent of maleic anhydride for each equivalent of the mixture of pentaerythritol and dipentaerythritol.

5. A process of producing an artificial wax as defined in claim 1, which comprises heating together approximately 0.75 equivalent proportion of stearic acid and 1 equivalent proportion of a polyhydric alcohol selected from the group consisting of pentaerythritol, polypentaerythritol and mixtures thereof at a temperature between approximately 150° and approximately 350° C. and thereafter adding approximately 0.25 equivalent proportion of maleic anhydride and continuing the heating at a temperature between approximately 150° and approximately 350° C.

6. A process of producing an artificial wax as defined in claim 2, which comprises heating together approximately 0.75 equivalent proportion of stearic acid and 1 equivalent proportion of pentaerythritol at a temperature between approximately 150° and approximately 350° C. and thereafter adding approximately 0.25 equivalent proportion of maleic anhydride and continuing the heating at a temperature between approximately 150° and approximately 350° C.

7. A process of producing an artificial wax as defined in claim 3, which comprises heating together approximately 0.75 equivalent proportion of stearic acid and 1 equivalent proportion of dipentaerythritol at a temperature between approximately 150° and approximately 350° C. and thereafter adding approximately 0.25 equivalent proportion of maleic anhydride and continuing the heating at a temperature between approximately 150° and approximately 350° C.

8. A dispersion in water of an artificial wax as defined in claim 1.

9. A paste wax comprising a colloidal mixture of water and an artificial wax as defined in claim 1.

10. A paste wax comprising a volatile solvent and an artificial wax as defined in claim 1.

HARRY BURRELL.
PHILIP I. BOWMAN.
ROBERT H. BARTH.

REFERENCES CITED

The following references are of record in the file of this patent:

UNITED STATES PATENTS

| Number | Name | Date |
|---|---|---|
| 1,914,100 | Bennett | June 13, 1933 |
| 2,025,612 | Rodman | Dec. 24, 1935 |
| 2,029,851 | Arvin | Feb. 4, 1936 |
| 2,033,131 | Ellis | Mar. 10, 1936 |
| 2,077,371 | Rheineck | Apr. 13, 1937 |
| 2,188,887 | Clocker | Jan. 30, 1940 |
| 2,234,934 | Steinle | Mar. 11, 1941 |
| 2,275,494 | Bennett | Mar. 10, 1942 |
| 2,315,708 | Hovey | Apr. 6, 1943 |

FOREIGN PATENTS

| Number | Country | Date |
|---|---|---|
| 468,533 | Great Britain | July 7, 1937 |

---

Certificate of Correction

Patent No. 2,427,255.   September 9, 1947.

HARRY BURRELL ET AL.

It is hereby certified that errors appear in the above numbered patent requiring correction as follows: In the grant, lines 4 and 18, and in the heading to the printed specification, line 12, name of assignee, for "Hayden" read *Heyden*; column 1, line 35, for "therein" read *herein*; line 39, for "the waxes" read *these waxes*; column 2, line 22, strike out the comma after "amounts" and insert the same in line 24 after "amount"; column 3, line 53, for "stoichimetric" read *stoichiometric*; column 5, line 50, strike out "or" before "scope"; line 52, Example 1, strike out "acid" and insert the same after "stearic", same line; column 6, line 39, for "besswax" read *beeswax*; same line, for "was" first occurrence, read *wax*; column 7, line 45, strike out "of" first occurrence and insert the same in line 44, same column, after "point"; column 8, line 7, after "150° C." insert a comma; line 8, after "12.2 g." insert *of*; line 26, for "or rather" read *of rather*; column 9, line 22, footnote 1 below the table, for "weighr" read *weight*; line 69, for "modling" read *molding*; and that the said Letters Patent should be read with these corrections therein that the same may conform to the record of the case in the Patent Office.

Signed and sealed this 2d day of December, A. D. 1947.

[SEAL]

THOMAS F. MURPHY,
*Assistant Commissioner of Patents.*